US012596909B2

(12) United States Patent
Li et al.

(10) Patent No.: US 12,596,909 B2
(45) Date of Patent: Apr. 7, 2026

(54) ONESHOT NEURAL ARCHITECTURE AND HARDWARE ARCHITECTURE SEARCH

(71) Applicant: Google LLC, Mountain View, CA (US)

(72) Inventors: Sheng Li, Cupertino, CA (US); Norman Paul Jouppi, Palo Alto, CA (US); Garrett Axel Andersen, Austin, TX (US); Quoc V. Le, Sunnyvale, CA (US); Liqun Cheng, Palo Alto, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 829 days.

(21) Appl. No.: 17/875,594

(22) Filed: Jul. 28, 2022

(65) Prior Publication Data

US 2024/0037373 A1     Feb. 1, 2024

(51) Int. Cl.
*G06N 3/045*     (2023.01)
*G06N 3/063*     (2023.01)

(52) U.S. Cl.
CPC ............. *G06N 3/045* (2023.01); *G06N 3/063* (2013.01)

(58) Field of Classification Search
CPC ............................... G06N 3/045; G06N 3/063
See application file for complete search history.

(56) References Cited

U.S. PATENT DOCUMENTS

2017/0160706 A1*  6/2017  Düll ..................... G05B 13/042
2020/0104687 A1   4/2020  Gesmundo

| | | |
|---|---|---|
| 2020/0143227 A1 | 5/2020 | Tan et al. |
| 2020/0265301 A1 | 8/2020 | Burger et al. |
| 2021/0034928 A1 | 2/2021 | Oh et al. |
| 2021/0383223 A1 | 12/2021 | Tan et al. |
| 2022/0019890 A1 | 1/2022 | Staffler et al. |
| 2022/0035878 A1 | 2/2022 | Sarah et al. |
| 2022/0036136 A1 | 2/2022 | Muehlberg et al. |
| 2022/0108054 A1 | 4/2022 | Akhauri et al. |
| 2022/0147680 A1* | 5/2022 | Zehngut ................. G06N 3/086 |
| 2022/0229960 A1* | 7/2022 | Nath ................... G06F 30/3315 |
| 2022/0405450 A1* | 12/2022 | Bunandar ............... G06F 30/27 |
| 2023/0064692 A1 | 3/2023 | Chen et al. |

(Continued)

FOREIGN PATENT DOCUMENTS

| CN | 112116156 A | 12/2020 |
|---|---|---|
| WO | 2022072890 A1 | 4/2022 |
| WO | 2022076933 A1 | 4/2022 |

OTHER PUBLICATIONS

International Search Report and Written Opinion for International Application No. PCT/US2022/033520 dated Dec. 8, 2022. 17 pages.

(Continued)

*Primary Examiner* — Tarek Chbouki

(74) *Attorney, Agent, or Firm* — Lerner David LLP

(57)     ABSTRACT

Aspects of the disclosure are directed to jointly searching machine learning model architectures and hardware architectures in a combined space of models, hardware, and mapping strategies. A search strategy is utilized where all models, hardware, and mappings are evaluated together at once via weight sharing and a supernetwork. A multi-objective reward function is utilized with objectives for quality, performance, power, and area.

17 Claims, 6 Drawing Sheets

(56)                    References Cited

U.S. PATENT DOCUMENTS

| | | | |
|---|---|---|---|
| 2023/0096654 A1 | 3/2023 | Salameh et al. | |
| 2023/0153506 A1* | 5/2023 | Park | G06N 3/092 |
| | | | 716/103 |

OTHER PUBLICATIONS

Bender et al. Can weight sharing outperform random architecture search? An investigation with TuNAS. Aug. 13, 2020. 13 pages.
Bender et al. Understanding and Simplifying One-Shot Architecture Search. 2018. Proceedings of the 35 th International Conference on Machine Learning, Stockholm, Sweden, 10 pages.
Bergstra et al. Algorithms for Hyper-Parameter Optimization. 2011. Advances in Neural Information Processing Systems 24 (NIPS 2011), pp. 1-9.
Cho et al. B2EA: An Evolutionary Algorithm Assisted by Two Bayesian Optimization Modules for Neural Architecture Search. Feb. 17, 2022. 25 pages.
Golovin et al. Google Vizier: A Service for Black-Box Optimization. Aug. 13-17, 2017. Halifax, NS, Canada. KDD 2017 Applied Data Science Paper, pp. 1487-1496.
Li et al. Searching for Fast Model Families on Datacenter Accelerators. 2021. Computer Vision Foundation, pp. 8085-8095.
Li et al. Searching for Fast Model Families on Datacenter Accelerators. Feb. 10, 2021, pp. 8085-8095.
Lin et al. NAAS: Neural Accelerator Architecture Search. May 27, 2021. 7 pages.
Lin et al. Neural-Hardware Architecture Search. 2019. 33rd Conference on Neural Information Processing Systems (NeurIPS 2019), Vancouver, Canada, 5 pages.
Parashar et al. Timeloop: A Systematic Approach to DNN Accelerator Evaluation. Apr. 25, 2019. 2019 IEEE International Symposium on Performance Analysis of Systems and Software (ISPASS). 12 pages.

Real et al. Regularized Evolution for Image Classifier Architecture Search. Feb. 16, 2019. AAAI 2019, the Thirty-Third AAAI Conference on Artificial Intelligence. 16 pages.
Tan et al. MnasNet: Platform-Aware Neural Architecture Search for Mobile. May 29, 2019. 9 pages.
Tang et al. NeuroMeter: An Integrated Power, Area, and Timing Modeling Framework for Machine Learning Accelerators. Apr. 22, 2021. 2021 IEEE International Symposium on High-Performance Computer Architecture (HPCA). pp. 855-867.
Yang et al. Co-Exploration of Neural Architectures and Heterogeneous ASIC Accelerator Designs Targeting Multiple Tasks. Feb. 10, 2020. 7 pages.
Zhang et al. A Full-Stack Search Technique for Domain Optimized Deep Learning Accelerators. Feb. 1, 2022. ASPLOS '22, Feb. 28-Mar. 4, 2022, Lausanne, Switzerland. 16 pages.
International Search Report and Written Opinion for International Application No. PCT/US2023/019338 dated Jul. 12, 2023. 15 pages.
Penney et al. A Survey of Machine Learning Applied to Computer Architecture Design. arxiv.org, Cornell University Library, 201 Olin Library Cornell University Ithaca, NY 14853, Sep. 26, 2019 (Sep. 26, 2019), 14 pages.
Robine et al. Smaller World Models for Reinforcement Learning. arxiv,org, Cornell University Library, 201 Olin Library Cornell University Ithaca, NY 14853, Mar. 2, 2021 (Mar. 2, 2021), 9 pages.
Sadasivam et al. Invited: Efficient Reinforcement Learning for Automating Human Decision-Making in SOC Design. 2018 55th ACM/ESDA/IEEE Design Automation Conference (DAC), IEEE, Jun. 24, 2018 (Jun. 26, 2018), pp. 1-6.
Shi et al. Reinforcement Learning Based Test Case Prioritization for Enhancing the Security of Software. 2020 IEEE 7th International Conference on Data Science and Advanced Analytics (DSAA) , IEEE, Oct. 6, 2020 (Oct. 6, 2020), pp. 663-672.

* cited by examiner

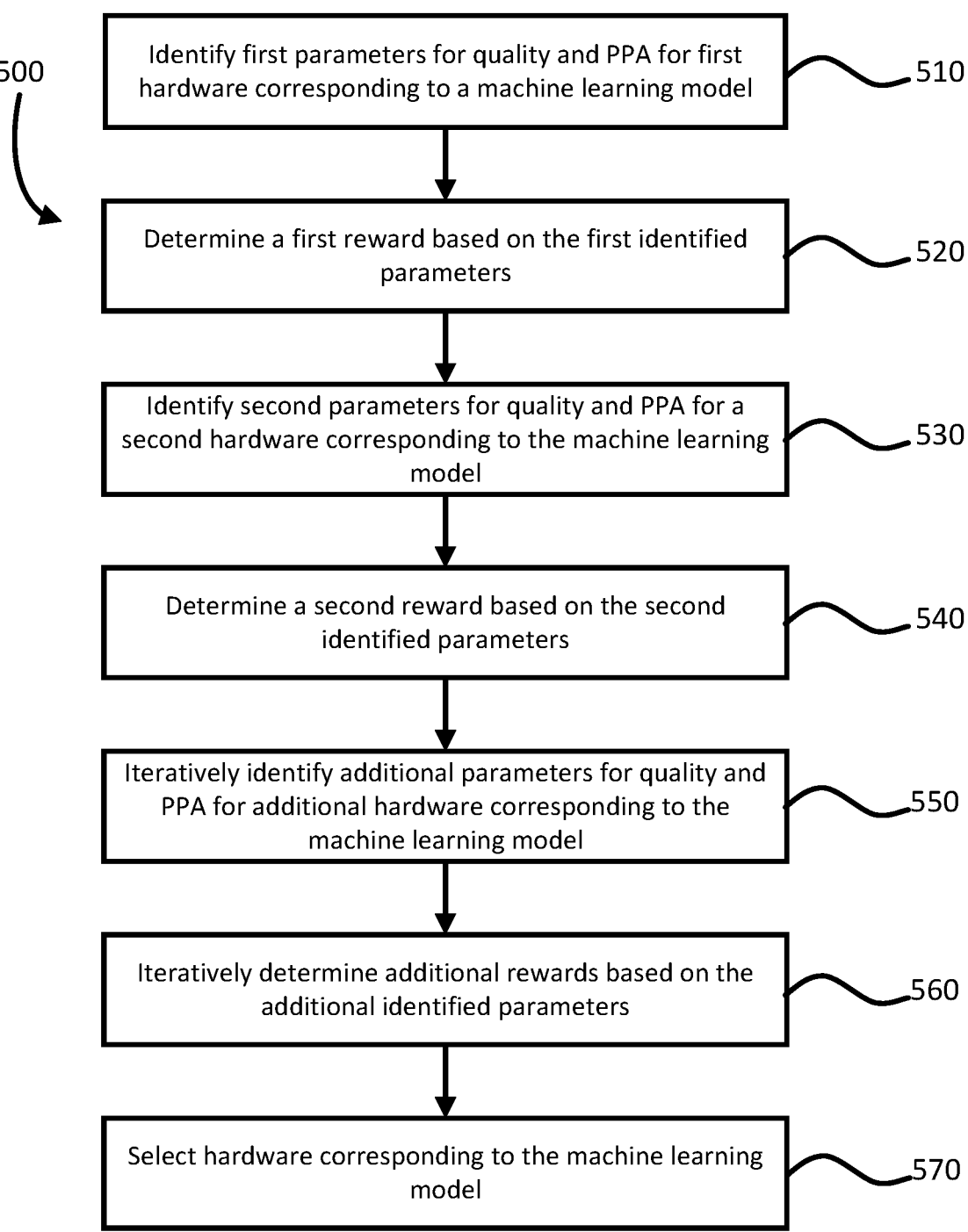

500

Identify first parameters for quality and PPA for first hardware corresponding to a machine learning model ⟶ 510

Determine a first reward based on the first identified parameters ⟶ 520

Identify second parameters for quality and PPA for a second hardware corresponding to the machine learning model ⟶ 530

Determine a second reward based on the second identified parameters ⟶ 540

Iteratively identify additional parameters for quality and PPA for additional hardware corresponding to the machine learning model ⟶ 550

Iteratively determine additional rewards based on the additional identified parameters ⟶ 560

Select hardware corresponding to the machine learning model ⟶ 570

FIG. 5

ONESHOT NEURAL ARCHITECTURE AND HARDWARE ARCHITECTURE SEARCH

BACKGROUND

The ever-increasing demand of high computing power for machine learning creates two major challenges. Existing machine learning models are no longer able to realize the full potential of hardware corresponding to them. This results in a rapidly-widening gap in efficiency, measured as achieved performance for existing machine learning models when running on hardware compared to peak performance offered by the hardware. Further, it is becoming harder to design future hardware with the continuous and significant increase in computing capability demand for each new generation.

There are generally three searches for jointly optimizing model architecture and hardware architecture: the search for machine learning models, the search for machine learning hardware, and the search for compiler and runtime that map the models to the hardware. Blackbox optimizations have been utilized to navigate a joint space of hardware and mappings. However, without first optimizing the machine learning models, it is unclear whether the models can provide the same level of performance gains once upgraded to the new hardware. Thus, searching hardware based on un-optimized models will likely miss opportunities offered by machine learning model optimizations. For example, compared to new hardware obtained via a hardware search, new models obtained via a model search can improve performance at a similar level without requiring more expensive hardware changes. Moreover, because the development phase for hardware is longer, it is better to capture the future model architectures and trends so that the future hardware can provide the better computing capacity for future models instead of previously known models.

Searching for models and hardware in isolation or sequentially can lead to un-optimized co-designs and searching for models and hardware jointly using a multi-trial approach can be too time-consuming to handle large scale machine learning applications and products.

BRIEF SUMMARY

Aspects of the disclosure are directed to jointly searching machine learning model architectures and hardware architectures in a combined space of models, hardware, and mapping strategies. A search strategy is utilized where all models, hardware, and mappings are evaluated together at once via weight sharing and a supernetwork. A multi-objective reward function is utilized with objectives for quality, performance, power, and area. The multi-objective reward function can determine a reward based on identified quality, performance, power, and area parameters, where that identified reward is used to identify additional quality, performance, power, and area parameters to determine additional rewards. Identifying parameters and determining rewards can be iterative, stopping when the determined rewards approach a convergence. Models and hardware can be selected based on the identified parameters that determined the rewards that approach a convergence.

An aspect of the disclosure provides for a method for performing a joint neural architecture and hardware architecture search. The method includes identifying, with the one or more processors, first parameters for a performance, power, and area (PPA) for a first hardware corresponding to a machine learning model via an offline-trained machine learning model for predicting PPA. The method further includes determining, with the one or more processors, a first reward based on the first identified parameters. The method also includes identifying, with the one or more processors, second parameters for a PPA for a second hardware corresponding to the machine learning model via the offline-trained machine learning model, the second parameters being identified based on the first reward. The method further includes determining, with the one or more processors, a second reward based on the second identified parameters. The method also includes selecting, with the one or more processors, hardware corresponding to the machine learning model based on the second reward.

In an example, the method further includes identifying, with the one or more processors, one or more parameters for a quality of the machine learning model via a neural architecture search, wherein determining the first reward is based further on the one or more parameters for the quality of the machine learning model. In another example, the method further includes generating, with the one or more processors, simulation results for performance, power, and area based on a dataset of sample model architectures, hardware architectures, and mapping strategies; and training, with the one or more processors, the offline-trained machine learning model based on the simulation results.

In yet another example, the first reward is determined by a rectified linear unit single-sided weighted sum reward function with the first parameters for performance, power, and area each included as separate sums in the reward function. In yet another example, the method further includes performing, with the one or more processors, a multi-trial search for determining the machine learning model to which the first and second hardware correspond. In yet another example, the second parameters are identified to increase a likelihood of determining a second reward that is better than the first reward.

In yet another example, the method further includes iteratively identifying, with the one or more processors, additional parameters for a PPA for additional hardware corresponding to the machine learning model via the offline-trained machine learning model, the additional parameters being identified based on a determined reward from a previous iteration; iteratively determining, with the one or more processors, additional rewards based on the additional identified parameters; and stopping, with the one or more processors, the iterative identifying and determining based on a stopping criterion, where selecting hardware corresponding to the machine learning model further comprises selecting hardware with parameters for PPA that corresponds to a reward that resulted in the stopping criterion. In yet another example, the stopping criterion includes the iteratively determined rewards approaching a convergence.

Another aspect of the disclosure provides for a system including one or more processors; and one or more storage devices coupled to the one or more processors and storing instructions that, when executed by the one or more processors, causes the one or more processors to perform operations for performing a joint neural architecture and hardware architecture search. The operations include identifying first parameters for a performance, power, and area (PPA) for a first hardware corresponding to a machine learning model via an offline-trained machine learning model for predicting PPA. The operations further include determining a first reward based on the first identified parameters. The operations also include identifying second parameters for a PPA for a second hardware corresponding to the machine learning model via the offline-trained machine learning model, the second parameters being identified based on the first reward. The operations further include determining a second reward based on the second identified parameters. The operations also include selecting hardware corresponding to the machine learning model based on the second reward.

In an example, the operations further include identifying one or more parameters for a quality of the machine learning model via a neural architecture search, wherein determining the first reward is based further on the one or more parameters for the quality of the machine learning model. In another example, the operations further include generating simulation results for performance, power, and area based on a dataset of sample model architectures, hardware architectures, and mapping strategies; and training the offline-trained machine learning model based on the simulation results.

In yet another example, the first reward is determined by a rectified linear unit single-sided weighted sum reward function with the first parameters for performance, power, and area each included as separate sums in the reward function. In yet another example, the operations further include performing a multi-trial search for determining the machine learning model to which the first and second hardware correspond. In yet another example, the second parameters are identified to increase a likelihood of determining a second reward that is better than the first reward.

In yet another example, the operations further include iteratively identifying additional parameters for a PPA for additional hardware corresponding to the machine learning model via the offline-trained machine learning model, the additional parameters being identified based on a determined reward from a previous iteration; iteratively determining additional rewards based on the additional identified parameters; and stopping the iterative identifying and determining based on a stopping criterion, where selecting hardware corresponding to the machine learning model further comprises selecting hardware with parameters for PPA that corresponds to a reward that resulted in the stopping criterion. In yet another example, the stopping criterion includes the iteratively determined rewards approaching a convergence.

Yet another aspect of the disclosure provides for a nontransitory computer readable medium for storing instructions that, when executed by one or more processors, causes the one or more processors to perform operations for performing a joint neural architecture and hardware architecture search. The operations include identifying first parameters for a performance, power, and area (PPA) for a first hardware corresponding to a machine learning model via an offline-trained machine learning model for predicting PPA. The operations further include determining a first reward based on the first identified parameters. The operations also include identifying second parameters for a PPA for a second hardware corresponding to the machine learning model via the offline-trained machine learning model, the second parameters being identified based on the first reward. The operations further include determining a second reward based on the second identified parameters. The operations also include selecting hardware corresponding to the machine learning model based on the second reward.

In an example, the operations further include generating simulation results for performance, power, and area based on a dataset of sample model architectures, hardware architectures, and mapping strategies; and training the offline-trained machine learning model based on the simulation results.

In another example, the first reward is determined by a rectified linear unit single-sided weighted sum reward function with the first parameters for performance, power, and area each included as separate sums in the reward function.

In yet another example, the operations further include performing a multi-trial search for determining the machine learning model to which the first and second hardware correspond.

BRIEF DESCRIPTION OF THE DRAWINGS

FIG. 5 depicts a flow diagram of an example process for a joint neural and hardware architecture search according to aspects of the disclosure.

DETAILED DESCRIPTION

Figure 1:
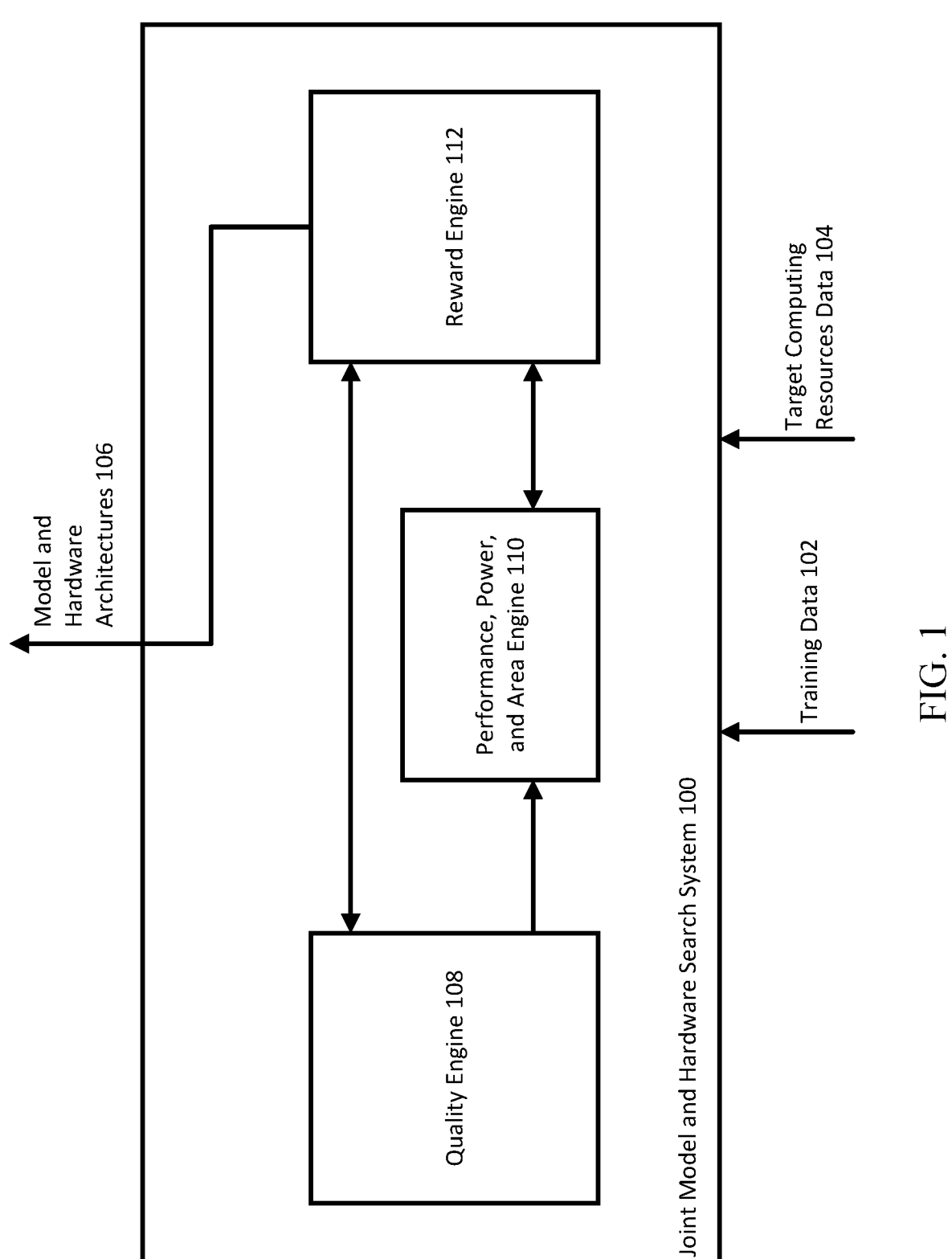
FIG. 1 depicts a block diagram of an example joint model and hardware search system according to aspects of the disclosure.

Generally disclosed herein are implementations for jointly searching machine learning model architectures and hardware architectures in a combined space of model architectures, hardware architectures, and mapping strategies. All models, hardware, and mappings can be evaluated together at once via weight sharing and a supernetwork, such as a OneShot search. The joint neural and hardware architecture search can utilize Bayesian optimization (BO), reinforcement learning (RL), evolution algorithms, and gradient-based algorithms, as nonlimiting examples.

Objectives for the joint neural architecture and hardware architecture search can include quality, performance, and hardware cost. Quality can correspond to accuracy, performance can correspond to speed, and hardware cost can correspond to chip power and chip area. Quality can be determined from a neural architecture search while performance, power, and area (PPA) can be determined from a joint neural architecture and hardware architecture search using model architecture parameters, hardware architecture parameters, and mapping strategy parameters. Model architecture parameters can include number of layers, layer width, convolution kernel size, activation functions, etc. Hardware architecture parameters can include number of tensor cores, matrix unit size, vector unit size, etc. Mapping strategy parameters can include compiler parameters such as block size, fusion choices, etc.

Rewards can be determined based on identified quality and PPA parameters, where the reward is used to identify additional quality and PPA parameters to determine additional rewards. Identifying the quality and PPA parameters can be iterative and can stop when the determined reward approaches a convergence.

The PPA parameters can be identified based on results from simulators, such as performance and chip simulators.

Simulators can correspond to modeling frameworks for machine learning accelerators, such as neurometer or timeloop. A machine learning model can be trained offline to be subsequently used online to drive the joint neural architecture and hardware architecture search. Offline training can correspond to training a machine learning model with a static dataset, such as a finite amount of data that does not change.

A parallel pipeline can train the offline machine learning model. The pipeline can generate sample model architectures, hardware architectures, and mapping strategies from their respective search spaces. In order to run the sample model architectures, hardware needs to execute instruction streams, which are generated by a compiler and tool chain.

The pipeline can utilize performance simulators for simulating performance and chip estimators for simulating power and area to generate PPA simulation results. The simulation results train the offline machine learning model based on the received sample model architectures, hardware architectures, and mapping strategies. The offline machine learning model can be verified based on a sample using real hardware. Once trained, the machine learning model can be used online to drive the joint neural architecture and hardware architecture search.

The approach can further include using a multi-objective reward function with objectives for quality and PPA. The multi-objective reward function outputs a reward, such as a score, for reinforcement learning to use to determine what subsequently to sample from the search space in order to increase the likelihood of achieving a higher reward. The multi-objective reward function can be a rectified linear unit (ReLu) single-sided weighted sum reward function with reward signals for quality, performance, power, and area. Performance, power, and area are included as separate sums rather than a combined product, as combined product can lead to suboptimal designs, such as a low performance machine learning accelerator with low power. Such an accelerator can have good energy-delay products, but performance would be too low to be sufficient for datacenter production usage.

The search space includes a model architecture search space, a hardware search space, and a mapping strategy search space. The resulting joint search space is a cartesian product of the model architecture search space and hardware/mapping search space, which can be a cartesian product of about $2^{\char`\^}300$ model architectures and $10^{\char`\^}20$ hardware/mapping architectures. OneShot search can be used for handling such an enormous search space.

The joint neural architecture and hardware architecture search can generate a single model with a particular PPA. To extend the search to a wider variety of machine learning model architectures, a hybrid and hierarchical search can be utilized. A single multi-trial search can govern multiple OneShot searches, with each OneShot search being for a different machine learning model architecture. The OneShot searches can share the same set of hardware and mapping configurations since all model architectures would run on the same determined hardware. The multi-trial search can be responsible for searching through the hardware and mapping search spaces. For each trial, the multi-trial search samples a set of hardware and mapping configurations and assigns them to all the OneShot searches to perform a joint OneShot neural architecture and hardware architecture search on the machine learning models simultaneously. The multi-trial search waits for the search results for the OneShot searches and generates the next set of hardware and mapping configurations based on the OneShot search results.

The OneShot searches can be stopped early based on early stopping criteria to save computing resources. For example, the OneShot searches can be stopped if the reward signals from the OneShot searches approach a convergence.

FIG. 1 depicts a block diagram of an example joint model and hardware search system 100. The joint model and hardware search system 100 can be configured to receive input data, such as via a user interface. For example, the joint model and hardware search system 100 can receive the input data as part of a call to an API exposing the joint model and hardware search system 100. The joint model and hardware search system 100 can be implemented on one or more computing devices. Input to the joint model and hardware search system 100 can be provided, for example, through a storage medium, including remote storage connected to the one or more computing devices over a network, or as input through a user interface on a client computing device coupled to the joint model and hardware search system 100.

The joint model and hardware search system 100 can be configured to receive training data 102 for training a neural network and target computing resources data 104 specifying target computing resources. The joint model and hardware search system 100 can be configured to implement the techniques for jointly searching machine learning model architectures and hardware architectures in a combined space of model architectures, hardware architectures, and mapping strategies, where all models, hardware, and mappings can be evaluated together at once via weight sharing and a supernetwork, to be described further below.

The training data 102 can correspond to a neural network task. A neural network task is a machine learning task that can be performed by a neural network. The neural network can be configured to receive any type of data input to generate output for performing a neural network task. As examples, the output can be any kind of score, classification, or regression output based on the input. Correspondingly, the neural network task can be a scoring, classification, and/or regression task for predicting some output given some input. These tasks can correspond to a variety of different applications in processing images, video, text, speech, or other types of data.

The training data 102 can be in any form suitable for training a neural network, according to one of a variety of different learning techniques. Learning techniques for training a neural network can include supervised learning, unsupervised learning, and semi-supervised learning techniques. For example, the training data 102 can include multiple training examples that can be received as input by a neural network. The training examples can be labeled with a desired output for the neural network when processing the labeled training examples. The label and the model output can be evaluated through a loss function to determine an error, which can be backpropagated through the neural network to update weights for the model. For example, if the neural network task is a classification task, the training examples can be images labeled with one or more classes categorizing subjects depicted in the images.

The target computing resources data 104 can specify characteristics for computing resources on which a neural network can be at least partially deployed. Computing resources can be housed in one or more datacenters or other physical locations hosting any of a variety of different types of hardware devices. Example types of hardware include central processing units (CPUs), graphics processing units (GPUs), edge or mobile computing devices, field programmable gate arrays (FPGAs) and various types of application-specific circuits (ASICs).

Some devices can be configured for hardware acceleration, which can include devices configured for efficiently performing certain types of operations. These hardware accelerators, which can for example include GPUs and tensor processing units (TPUs), can implement special features for hardware acceleration. Example features for hardware acceleration can include configuration to perform operations commonly associated with machine learning model execution, such as matrix multiplication. These special features can also include, as examples, matrix-multiply-and-accumulate units available in different types of GPUs, as well as matrix multiply units, available in TPUs.

The target computing resources data 104 can include data for one or more target sets of computing resources. A target set of computing resources can refer to a collection of computing devices on which a neural network is desired to be deployed over. Information specifying the target set of computing resources can refer to the type and/or quantity of hardware accelerators or other computing devices in the target set. The target set can include devices of the same or different types. For example, a target set of computing resources can define hardware characteristics and quantity for a particular type of hardware accelerator, including its processing capability, throughput, and memory capacity. As described herein, the joint model and hardware search system 100 can generate one or more neural network architectures for each device specified in the target set of computing resources. In some examples, the target set of computing resources can specify computing resources for devices with less overall computational capacity than devices in a datacenter, such as wearable devices, including headphones, earbuds, smartwatches, mobile phones, etc., on which a neural network is deployed.

In addition, the target computing resources data 104 can specify different target sets of computing resources, reflecting for example different potential configurations of computing resources housed in a data center. From this training data 102 and target computing resources data 104, the joint model and hardware search system 100 can generate neural network architectures and hardware architectures.

The joint model and hardware search system 100 can be configured to output a neural network architecture and hardware architecture 106, or a family of neural network architectures and hardware architectures. The architectures 106 can be sent as an output, for example for display on a user display. In some implementations, the system 100 can be configured to provide the architectures 106 as a set of computer-readable instructions, such as a one or more computer programs.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described herein, for example, as performed by a system, engine, module, or model.

The joint model and hardware search system 100 can be configured to forward data for the neural network architectures and hardware architectures 106 to one or more other devices configured for translating the architectures into an executable program written in a computer programming language and optionally as part of a framework for generating machine learning models and hardware. The joint model and hardware search system 100 can also be configured to send data corresponding to the neural network architectures and hardware architectures 106 to a storage device for storage and later retrieval.

The joint model and hardware search system 100 can include a quality engine 108. The quality engine 108 can be implemented as one or more computer programs, specially configured electronic circuitry, or any combination of the preceding. The quality engine 108 can be configured to identify one or more parameters relating to quality of a machine learning model based on the training data 102 and target computing resources data 104 via a neural architecture search, such as a multi-trial or OneShot search. Parameters relating to quality of a machine learning model can include number of layers, layer width, convolution kernel size, and activation functions.

The joint model and hardware search system 100 can further include a performance, power, and area (PPA) engine 110. The PPA engine 110 can be implemented as one or more computer programs, specially configured electronic circuitry, or any combination of the preceding. The PPA engine 110 can be configured to identify one or more parameters relating to PPA for hardware corresponding to the machine learning model based on the training data 102 and target computing resources data 104 via an offline-trained machine learning model for predicting PPA. Parameters relating to PPA for the hardware can include number of tensor cores, matrix unit size, vector unit size, block size, and fusion choices.

The joint model and hardware search system 100 can also include a reward engine 112. The reward engine 112 can be implemented as one or more computer programs, specially configured electronic circuitry, or any combination of the preceding. The reward engine 112 can be configured to determine rewards based on the identified parameters relating to quality of a machine learning model and PPA for hardware for the machine learning model. The reward engine 112 can determine rewards using a rectified linear unit single-sided weight sum reward function.

Based on the determined rewards, the quality engine 108 and PPA engine 110 can identify additional parameters relating to quality and PPA. The reward engine 112 can determine additional rewards based on the additional parameters. Identifying the quality and PPA parameters as well as determining the rewards can be iterative and can stop based on a stopping criterion, such as when the determined rewards approach a convergence. The joint model and hardware search system 100 can output the machine learning model architecture and hardware architecture 106 based on the quality and PPA parameters that led to the stopping criterion.

For performing joint model and hardware searches more generally, the system 100 can repeatedly identify candidate machine learning models and hardware from the respective search spaces, obtain evaluation metrics corresponding to multiple objectives for quality and PPA, and evaluate the candidate machine learning model and hardware according to their evaluation metrics. Candidate machine learning models can also be different types, such as feed-forward neural networks, recurrent neural networks, and convolution neural networks. As part of obtaining the evaluation metrics, the joint model and hardware search system 100 can train the candidate machine learning model on candidate hardware using training data. Once trained, the search system 100 can evaluate the candidate machine learning model on the candidate hardware to determine its evaluation metrics and compare the evaluation metrics according to a current best candidate model and hardware.

The joint model and hardware search system 100 can repeatedly perform this search process by selecting a candidate model and hardware, training the model on the hardware, and comparing its evaluation metrics to a current best candidate model and hardware, until reaching stopping criteria. The stopping criteria can be a minimum predetermined threshold of quality and PPA met by a current candidate model and hardware. The stopping criteria in addition or alternatively can be a maximum number of search iterations or a maximum amount of time allocated for performing the search. The stopping criteria can also be a condition in which the search converges, such as the quality and PPA of a subsequent iteration is less than a threshold different from the quality and PPA of the previous iteration. The stopping criteria can also specify threshold ranges for quality and PPA predetermined to be optimal.

The joint model and hardware search system 100 can be configured to use a machine learning model or other technique for selecting the next candidate model and hardware, where the selection can be based at least in part on learned characteristics for the different candidate models and hardware that are more likely to perform well under the objectives for a particular machine learning task.

To measure the quality and PPA of a candidate model and candidate hardware, the search system 100 can use the training data 102 to train the candidate model on candidate hardware to perform a machine learning task. The search system 100 can split the training data 102 into a training set, a validation set, and/or a testing set. An example training/testing split can be an 80/20 split. For example, the system can apply a supervised learning technique to calculate an error between output generated by the candidate model on candidate hardware, with a ground-truth label of a training example processed by the model. The search system 100 can use any of a variety of loss or error functions appropriate for the type of the task the machine learning model is being trained for, such as cross-entropy loss for classification tasks, or mean square error for regression tasks. The gradient of the error with respect to the different weights of the candidate model on candidate hardware can be calculated, for example using the backpropagation algorithm, and the weights for the model can be updated. The search system 100 can be configured to train the candidate model on candidate hardware until stopping criteria are met, such as a number of iterations for training, a maximum period of time, convergence, or when a minimum accuracy threshold is met.

Figure 2:
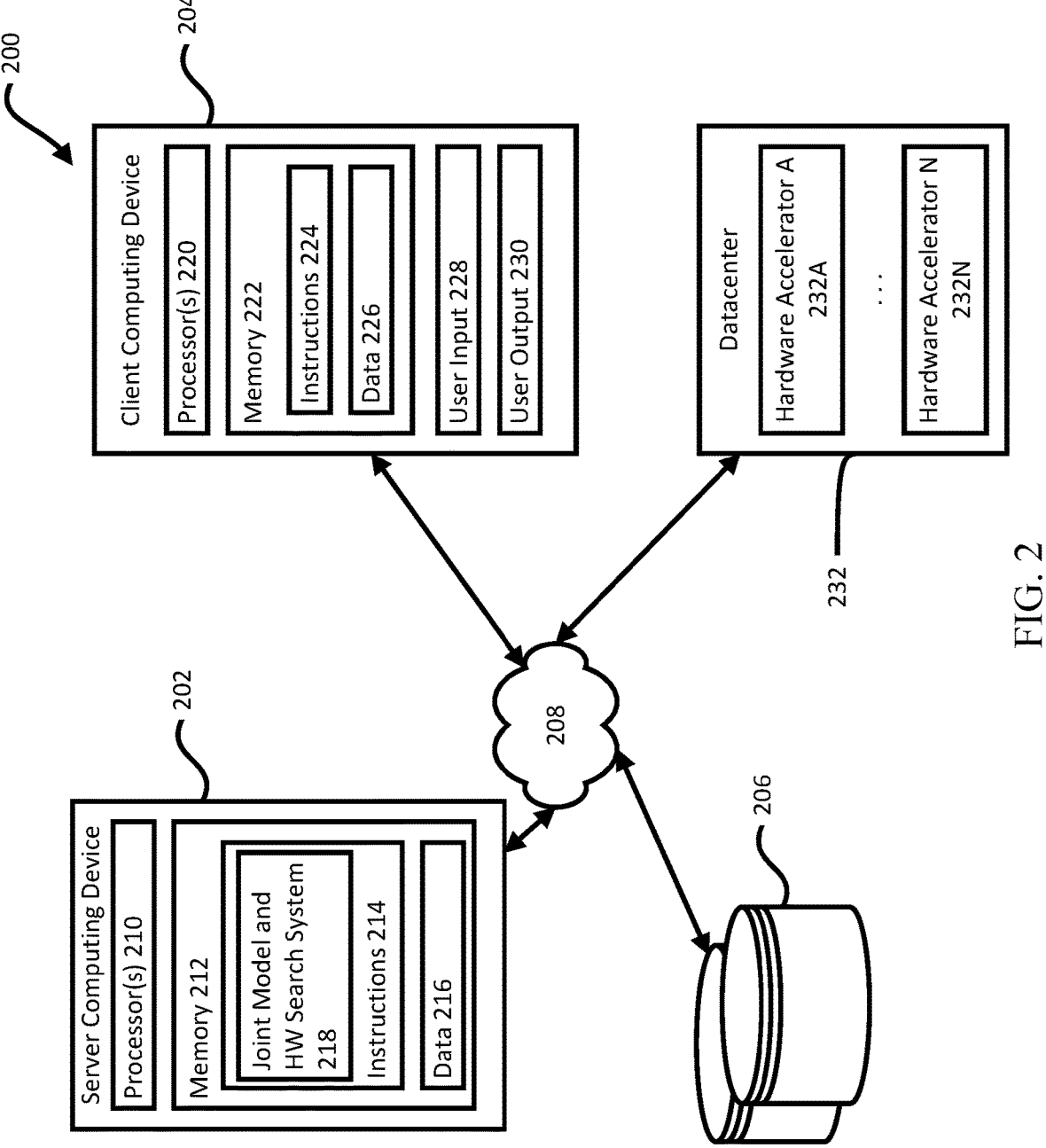
FIG. 2 depicts a block diagram of an example environment for implementing a joint neural architecture and hardware architecture search according to aspects of the disclosure.

FIG. 2 depicts a block diagram of an example environment 200 for implementing a joint neural architecture and hardware architecture search. The system 200 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that when executed by the processors 210, causes the one or more processors to perform actions defined by the instructions. The instructions 214 can be stored in object code format for direct processing by the processors 210, or in other formats including interpretable scripts or collections of independent source code modules that are interpreted on demand or compiled in advance. The instructions 214 can include instructions for implementing a joint model and hardware search system 218, which can correspond to the joint model and hardware search system 118 of FIG. 1. The joint model and hardware search system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228, and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a datacenter 232 housing any number of hardware accelerators 232A-N. The datacenter 232 can be one of multiple datacenters or other facilities in which various types of computing devices, such as hardware accelerators, are located. Computing resources housed in the datacenter 232 can be specified for deploying neural network architectures on hardware architectures, as described herein.

The server computing device 202 can be configured to receive requests to process data from the client computing device 204 on computing resources in the datacenter 232. For example, the environment 200 can be part of a computing platform configured to provide a variety of services to users, through various user interfaces and/or application programming interfaces (APIs) exposing the platform services. One or more services can be a machine learning framework or a set of tools for generating neural networks or other machine learning models according to a specified task and training data. The client computing device 204 can receive and transmit data specifying target computing resources to be allocated for executing a neural network trained to perform a particular neural network task. The joint model and hardware search system 218 can receive the data specifying the target computing resources and/or training data, and in response, generate one or more neural network architectures and hardware architectures for deploying on the target computing resources, according to aspects of the disclosure described further below.

As other examples of potential services provided by a platform implementing the environment 200, the server computing device 202 can maintain a variety of neural network architectures in accordance with different potential target computing resources available at the datacenter 232. For example, the server computing device 202 can maintain different families for deploying neural networks on the various types of TPUs and/or GPUs housed in the datacenter 232 or otherwise available for processing.

The devices 202, 204 and the datacenter 232 can be capable of direct and indirect communication over the network 208. For example, using a network socket, the client computing device 204 can connect to a service operating in the datacenter 232 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 208, in addition or alternatively, can also support wired connections between the devices 202, 204 and the datacenter 232, including over various types of Ethernet connection.

Although a single server computing device 202, client computing device 204, and datacenter 232 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing neural networks, and any combination thereof.

Figure 3:
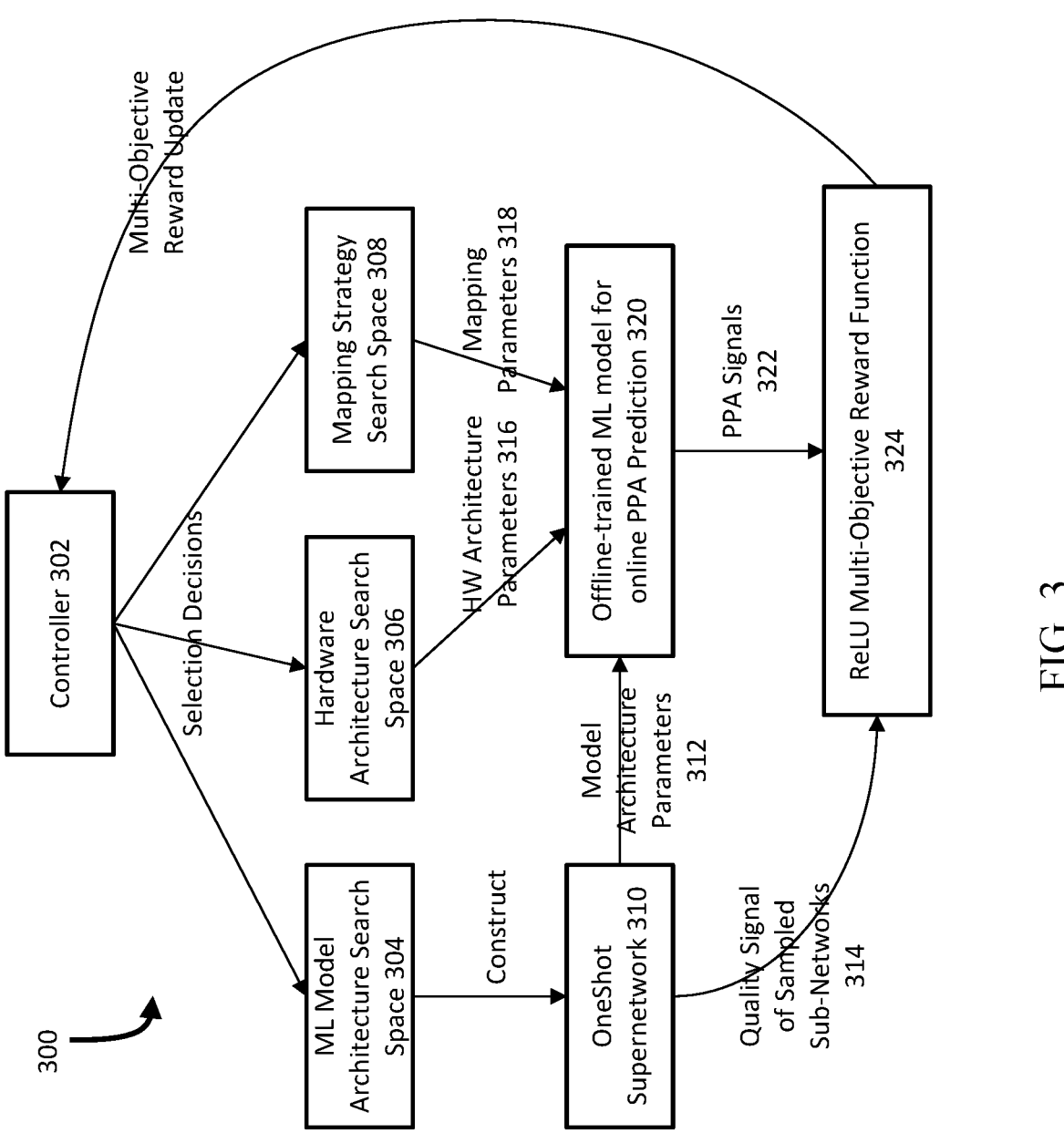
FIG. 3 depicts a block diagram of an example joint model architecture and hardware architecture search according to aspects of the disclosure.

FIG. 3 depicts a block diagram of an example joint model architecture and hardware architecture search 300, where all models, hardware, and mappings are evaluated together at once via weight sharing and a supernetwork. The joint model and hardware architecture search 300 can utilize Bayesian optimization (BO), reinforcement learning (RL), evolution algorithms, and gradient-based algorithms, as nonlimiting examples.

The search 300 can include a controller 302 configured to select machine learning models and hardware. The controller 302 can correspond to the processors 210 that execute instructions 214 derived from the joint model and hardware search system 218 as depicted in the environment 200 in FIG. 2.

The controller 302 can select candidate models, hardware, and mapping strategies from a model architecture search space 304, hardware architecture search space 306, and mapping strategy search space 306, respectively. The resulting joint search space of models, hardware, and mapping strategies is a cartesian product of the model architecture search space, e.g., about $2^{300}$ choices, and hardware/mapping search space, e.g., about $10^{20}$ choices. OneShot search can be ideal for handling such an enormous search space.

Objectives for the joint neural architecture and hardware architecture search can include quality, performance, and hardware cost. Quality of a model can correspond to accuracy, performance of a model can correspond to speed, and hardware cost for implementing a model can correspond to chip power and chip area.

The controller 302 can determine quality from a neural architecture search 310, such as a OneShot search. In the OneShot search, all models, hardware, and mappings can be evaluated together at once via weight sharing and a supernetwork. Weight sharing involves using the same weights to evaluate different models. A supernetwork includes a combination of the models. The neural architecture search 310 can include reinforcement learning, evolution algorithms, and gradient-based algorithms, such as backpropagation with stochastic gradient descent, mini-batch gradient descent, and/or batch gradient descent, with network weight updates, as examples. A multi-trial or other neural architecture search could also be used to determine quality. The neural architecture search 310 can output model architecture parameters 312 and a quality signal 314. Model architecture parameters 312 can include number of layers, layer width, convolution kernel size, activation functions, as examples.

The controller 302 can also select hardware architecture parameters 316 and mapping parameters 318. Hardware architecture parameters can include number of tensor cores, matrix unit size, vector unit size, as examples. Mapping strategy parameters can include compiler parameters such as block size, fusion choices, as examples.

The hardware architecture parameters 316 and mapping parameters 318, along with the model architecture parameters 312, can be input into an offline-trained machine learning model 320 for PPA prediction. The offline-trained machine learning model 320 can output PPA signals 322.

The PPA signals 322 can be determined based on results from simulators, such as performance and chip simulators. Simulators can correspond to modeling frameworks for machine learning accelerators. Example simulators include neurometer and timeloop.

Performance and chip simulators can have a simulation speed that is too slow to provide the training/search steps needed for a OneShot joint search of machine learning models and hardware. For example, performance and chip simulators can have a simulation speed that varies from about 1-1000 minutes to generate PPA results while a OneShot joint search can require at most a 100 ms simulation speed. Training the machine learning model 320 offline for subsequent use online to drive the joint neural architecture and hardware architecture search can overcome such as speed problem. Offline training can refer to training a machine learning model with a static dataset, such as a finite amount of data that does not change.

Figure 4:
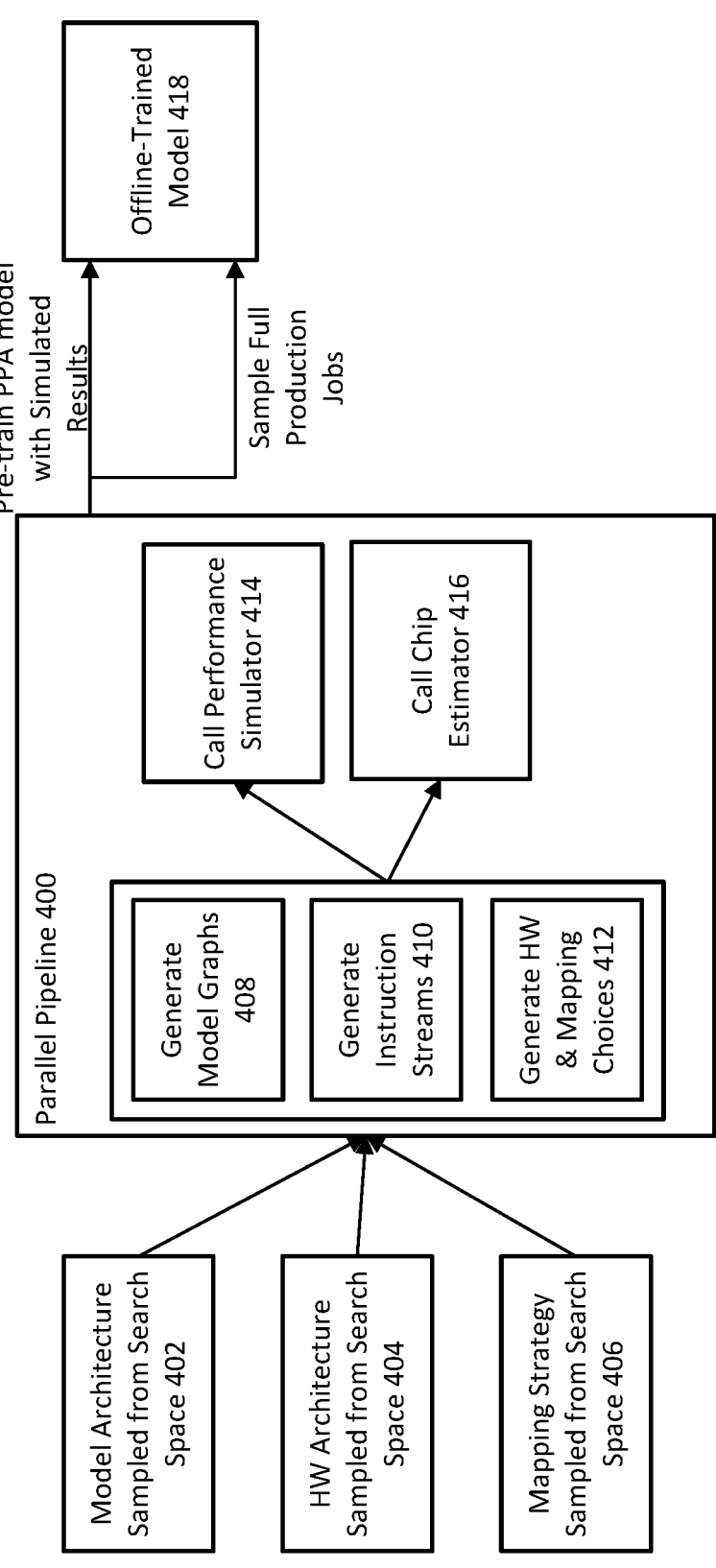
FIG. 4 depicts a block diagram of an example parallel pipeline to offline-train the machine learning model according to aspects of the disclosure.

FIG. 4 depicts a block diagram of an example parallel pipeline 400 to offline-train the machine learning model 320. The pipeline 400 can be implemented on one or more computing devices, such as server computing device 202 as depicted in the environment 200 of FIG. 2. The pipeline 400 can receive sample model architectures 402, hardware architectures 404, and mapping strategies 406 from their respective search spaces. Based on the received samples, a compiler and tool chain, such as accelerated linear algebra (XLA) or tensorflow, can generate model graphs 408 and instruction streams 410 for hardware to execute. The compiler and tool chain can further generate hardware and mapping strategies 412.

The pipeline 400 can forward the generated model graphs 408, instruction streams 410, and hardware and mapping strategies 412 to performance simulators 414 for simulating performance and chip estimators 416 for simulating power and area. The simulators can correspond to modeling frameworks for machine learning accelerators. The performance simulators 414 and chip estimators 416 can generate PPA simulation results. The pipeline 400 can use the simulation results to pre-train an offline-trained machine learning model 418 for predicting PPA. The pipeline 400 can also verify PPA predictions of the offline-trained machine learning model 418 based on a sample of full production jobs using real hardware. Once trained, the machine learning model 418 can be used online to drive the joint neural architecture and hardware architecture search to generate PPA signals.

Referring back to FIG. 3, the controller 302 can determine rewards based on the quality signals 314 and PPA signals 322 using a multi-objective reward function 324. The controller 302 can receive the rewards and select additional parameters for generating quality and PPA signals that determine additional rewards. Generating the quality signals 314 and PPA signals 322 can be iterative, stopping when the determined rewards from the multi-objective function 324 approach a convergence.

The multi-objective reward function 324 may include inputs for quality 314 and inputs for PPA 322. The multi-objective reward function 324 outputs a reward, such as a score, to determine what subsequently to sample from the search space in order to increase the likelihood of achieving a better reward, such as a higher score. The multi-objective reward function 324 can be a rectified linear unit (ReLu)

single-sided weighted sum reward function with reward signals for quality, performance, power, and area, such as the example depicted in Eq. 1.

$$r(\alpha) = Q(\alpha) + \beta_{T0}ReLU\left(\frac{T0(\alpha)}{T0} - 1\right) + \dots \beta_{Tn}ReLU\left(\frac{Tn(\alpha)}{Tn} - 1\right) \quad (1)$$

For a given combination a of model architecture, hardware architecture, and mapping, $Q(\alpha)$ is the quality, $Tn(\alpha)$ is one of the PPA objectives, and $\beta_{Tn}$ is the weight of the objective in the total reward. Performance, power, and area objectives are included as separate sums rather than a combined product, which can lead to suboptimal designs, such as a low performance machine learning accelerator with low power. Such an accelerator can have good energy-delay products, but performance would be too low to be sufficient for datacenter production usage.

FIG. 5 depicts a flow diagram of an example process 500 for a joint neural and hardware architecture search. The example process 500 can be performed on a system of one or more processors in one or more locations, such as the joint model and hardware search system 100 of FIG. 1.

As shown in block 510, the joint model and hardware search system 100 identifies first parameters for quality and PPA for first hardware corresponding to a machine learning model. The joint model and hardware search system 100 can identify parameters for quality from a neural architecture search, such as a OneShot search. The joint model and hardware search system 100 can identify parameters for PPA via an offline-trained machine learning model for PPA prediction. The offline-trained machine learning model can be trained based on results from performance and chip simulators using sample model architectures, hardware architectures, and mapping strategies.

As shown in block 520, the joint model and hardware search system 100 determines a first reward based on the first identified parameters. The search system 100 can determine the first reward using a multi-objective reward function, such as a rectified linear unit single-sided weight sum reward function with separate signals for quality, performance, power, and area.

As shown in block 530, the joint model and hardware search system 100 identifies second parameters for quality and PPA for a second hardware corresponding to the machine learning model. The joint model and hardware search system 100 can identify parameters for quality from the neural architecture search and can identify parameters for PPA via the offline-trained machine learning model for PPA prediction. The joint model and hardware search system can identify parameters that can increase the likelihood of achieving a better reward than the first reward.

As shown in block 540, the joint model and hardware search system 100 determines a second reward based on the second identified parameters. The search system 100 can determine the second reward using the multi-objective reward function.

As shown in blocks 550 and 560, the joint model and hardware search system 100 iteratively identifies additional parameters for quality and PPA for additional hardware corresponding to the machine learning model as well as iteratively determines additional rewards based on the additional identified parameters.

As shown in block 570, the joint model and hardware search system 100 selects hardware corresponding to the machine learning model when the determined rewards from the multi-objective reward function approach a convergence. The search system 100 can stop the iterative identification of additional parameters for quality and PPA and iterative determination of rewards.

The joint neural architecture and hardware architecture search system 100 can generate a single model with a particular PPA. To extend the search to a wider variety of machine learning model architectures, a hybrid and hierarchical search can be utilized.

Figure 6:
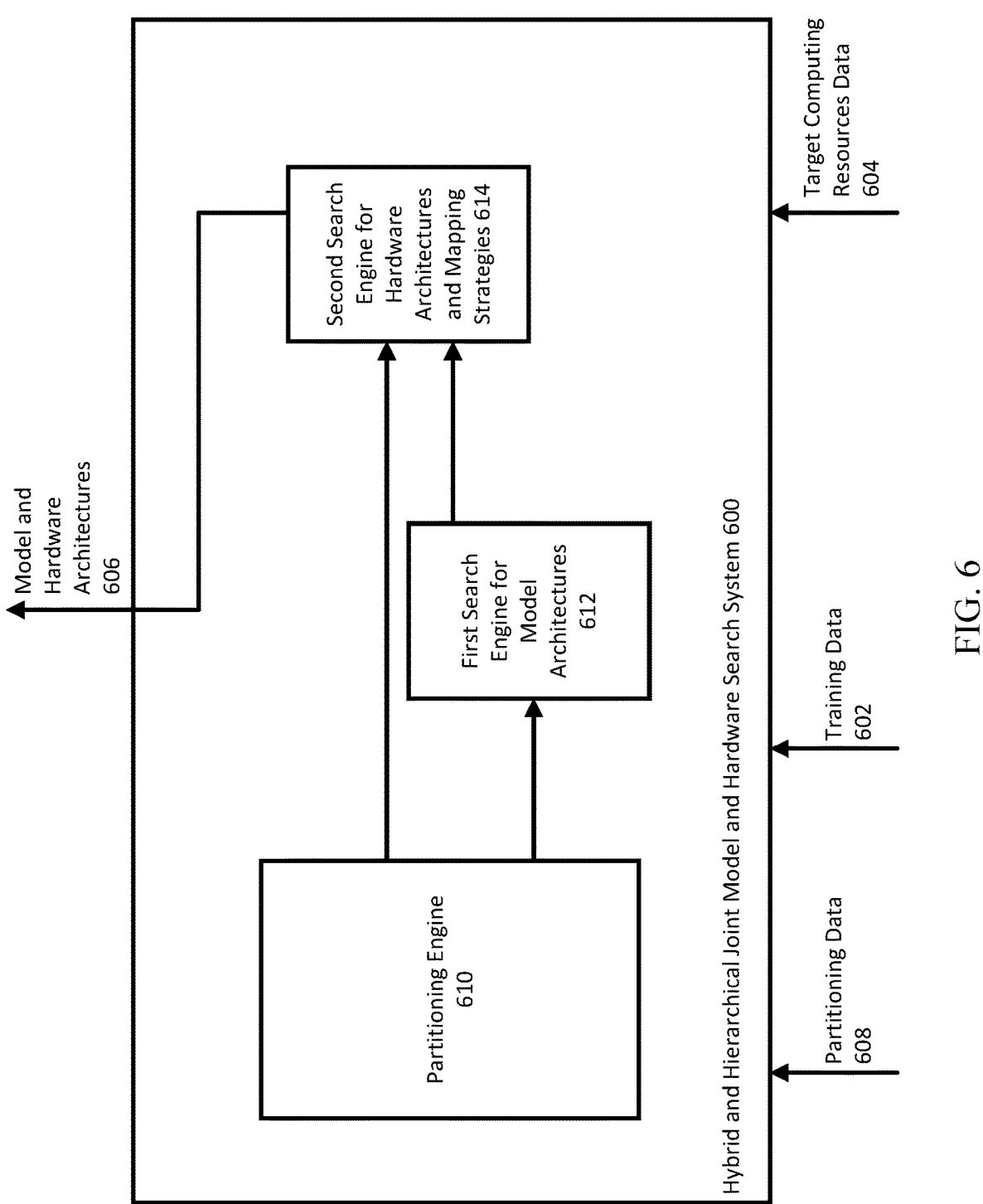
FIG. 6 depicts a block diagram of an example hybrid and hierarchical joint model and hardware search system according to aspects of the disclosure.

FIG. 6 depicts a block diagram of an example hybrid and hierarchical joint model and hardware search system 600. The hybrid and hierarchical search system 600 can be configured to receive input data according to a user interface. For example, the hybrid and hierarchical search system 600 can receive the input data as part of a call to an API exposing the hybrid and hierarchical search system 600. The hybrid and hierarchical search system 600 can be implemented on one or more computing devices. Input to the hybrid and hierarchical search system 600 can be provided, for example, through a storage medium, including remote storage connected to the one or more computing devices over a network, or as input through a user interface on a client computing device coupled to the hybrid and hierarchical search system 600.

The hybrid and hierarchical search system 600 can be configured to receive training data 602 for training a neural network, target computing resources data 604 specifying target computing resources, and partitioning data 608 for dividing a search space.

The training data 602 can correspond to a neural network task and can be in any form suitable for training a neural network, according to one of a variety of different learning techniques, as described above. The target computing resources data 604 can specify characteristics for computing resources on which a neural network can be at least partially deployed, as described above. Partitioning data 608 can correspond to a partitioning scheme for dividing the search space. The partitioning scheme can be based on model architecture parameters, hardware capacity, model hyperparameters, and/or compiler flags, as examples. From this training data 602, target computing resources data 604, and partitioning data 606, the hybrid and hierarchical search system 600 can generate model architectures and hardware architectures 606.

The hybrid and hierarchical search system 600 can include a partitioning engine 610. The partitioning engine 610 can be implemented as one or more computer programs, specially configured electronic circuitry, or any combination of the preceding. The partitioning engine 610 can be configured to divide the model architecture, hardware architecture, and mappings search space into sub-search spaces according to a partitioning scheme based on the received partitioning data 608. The partitioning scheme may be based on model architecture parameters, hardware capacity, model hyperparameters, or compiler flags, as examples.

The hybrid and hierarchical search system 600 can further include a first search engine 612 for model architectures. The first search engine 612 can be implemented as one or more computer programs, specially configured electronic circuitry, or any combination of the preceding. The first search engine 612 can be configured to receive the training data 602 and the target computing resources data 604 and generate a model architecture based on a first type of search across the sub-search spaces. The first search engine 612 can implement a first type of search where every model is evaluated separately without interference between models, such as a multi-trial search. The first type of search can include performing multiple full trainings over different configurations. The first type of search can include a random strategy, a grid-based strategy, an evolutionary algorithm-based strategy, a tree-based strategy, a Bayesian optimization strategy, a reinforcement learning (RL) strategy, and a strategy based on constrained or unconstrained nonlinear optimization, as examples.

The hybrid and hierarchical search system 600 can also include a second search engine 614 for hardware architecture and mapping strategies. The second search engine 614 can be implemented as one or more computer programs, specially configured electronic circuitry, or any combination of the preceding. The second search engine 614 can be configured to receive the training data 602, the target computing resources data 604, and the generated model architecture from the first search engine 612 and generate the outputted model and hardware architectures 606 based on a second type of search within each sub-search space. The second search engine 112 can implement the second type of search where all models are evaluated together at once using weight sharing and a supernetwork, such as a One-Shot search. The second type of search can include reinforcement learning, evolution algorithms, and gradient-based algorithms, such as backpropagation with stochastic gradient descent, mini-batch gradient descent, and/or batch gradient descent, with network weight updates, as examples.

A multi-trial search from the first search engine 612 can govern multiple OneShot searches from the second search engine 614, with each OneShot search being for a different machine learning model architecture. The OneShot searches from the second search engine 614 can share the same set of hardware and mapping configurations, since all model architectures would run on the same determined hardware. The multi-trial search from the first search engine 612 can be responsible for searching through the hardware and mapping search spaces. For each trial, the first search engine 612 samples a set of hardware and mapping configurations and assigns them to all the OneShot searches for the second search engine 614 to perform a joint OneShot neural architecture and hardware architecture search on the machine learning models, as described with respect to the system 100 in FIG. 1. The first search engine 612 waits for the search results of the OneShot searches and generates the next set of hardware and mapping configurations based on the OneShot search results.

The OneShot searches from the second search engine 614 can be automatically stopped early based on early stopping criteria to save computing resources. The early stopping criteria are monitored during the search progress to determine whether to stop the search. Early stopping criteria include but are not limited to an architecture searchable parameter converging to a minimum or maximum value, an accuracy/quality threshold being met, a threshold amount of data consumed, or a convergence rate threshold on any quantity produced by the model being met.

With respect to converging to a minimum or maximum value, it may be detected when one or more search parameters are beginning to converge or when a derived metric computed by the model is beginning to converge. When convergence is detected, each search in the sub-search spaces is automatically stopped. For example, the search may be stopped when architecture searchable parameters start approaching convergence within a threshold, achieve a predetermined degree of convergence, or fully converge. Parameters may include but are not limited to layer width, convolution kernel size, choice of activation functions, or embedding width. One example indication of when the parameters start to converge can include stabilization of oscillations of the parameters. Another example can include internal confidence metrics computed by the model crossing a threshold value, such as approaching 1.

As described herein, aspects of the disclosure provide for generating a joint model architecture and hardware architecture search. Examples of machine learning model or neural network tasks follow.

As an example, the input to the neural network can be in the form of images, videos. A neural network can be configured to extract, identify, and generate features as part of processing a given input, for example as part of a computer vision task. A neural network trained to perform this type of neural network task can be trained to generate an output classification from a set of different potential classifications. In addition to or alternatively, the neural network can be trained to output a score corresponding to an estimated probability that an identified subject in the image or video belongs to a certain class.

As another example, the input to the neural network can be data files corresponding to a particular format, e.g., HTML files, word processing documents, or formatted metadata obtained from other types of data, such as metadata for image files. A neural network task in this context can be to classify, score, or otherwise predict some characteristic about the received input. For example, a neural network can be trained to predict the probability received input includes text relating to a particular subject. Also, as part of performing a particular task, the neural network can be trained to generate text predictions, for example as part of a tool for auto-completion of text in a document as the document is being composed. A neural network can also be trained for predicting a translation of text in an input document to a target language, for example as a message is being composed.

Other types of input documents can be data relating to characteristics of a network of interconnected devices. These input documents can include activity logs, as well as records concerning access privileges for different computing devices to access different sources of potentially sensitive data. A neural network can be trained for processing these and other types of documents for predicting on-going and future security breaches to the network. For example, the neural network can be trained to predict intrusion into the network by a malicious actor.

As another example, the input to a neural network can be audio input, including streamed audio, pre-recorded audio, and audio as part of a video or other source or media. A neural network task in the audio context can include speech recognition, including isolating speech from other identified sources of audio and/or enhancing characteristics of identified speech to be easier to hear. A neural network can be trained to predict an accurate translation of input speech to a target language, for example in real-time as part of a translation tool.

In addition to data input, including the various types of data described herein, a neural network can also be trained to process features corresponding to given input. Features are values, e.g., numerical or categorical, which relate to some characteristic of the input. For example, in the context of an image, a feature of the image can relate to the RGB value for each pixel in the image. A neural network task in the image/video context can be to classify contents of an image or video, for example for the presence of different people, places, or things. Neural networks can be trained to extract and select relevant features for processing to generate an output for a given input and can also be trained to generate new features based on learned relationships between various characteristics of input data.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for performing a joint neural architecture and hardware architecture search, the method comprising:

performing, with one or more processors, a multi-trial search governing multiple OneShot searches for different machine learning models to perform a particular task;

determining, with the one or more processors, a machine learning model to which a first hardware and a second hardware correspond based on the multi-trial search;

identifying, with the one or more processors, first parameters for a performance, power, and area (PPA) for the first hardware via an offline-trained machine learning model for predicting PPA;

determining, with the one or more processors, a first reward based on the first identified parameters;

identifying, with the one or more processors, second parameters for a PPA for the second hardware via the offline-trained machine learning model, the second parameters being identified based on the first reward;

determining, with the one or more processors, a second reward based on the second identified parameters; and selecting, with the one or more processors, hardware corresponding to the machine learning model based on the first reward and the second reward to perform the particular task.

2. The method of claim 1, further comprising identifying, with the one or more processors, one or more parameters for a quality of the machine learning model via a neural architecture search, wherein determining the first reward is based further on the one or more parameters for the quality of the machine learning model.

3. The method of claim 1, further comprising:

generating, with the one or more processors, simulation results for performance, power, and area based on a dataset of sample model architectures, hardware architectures, and mapping strategies; and training, with the one or more processors, the offline-trained machine learning model based on the simulation results.

4. The method of claim 1, wherein the first reward is determined by a rectified linear unit single-sided weighted sum reward function with the first parameters for performance, power, and area each included as separate sums in the reward function.

5. The method of claim 1, wherein the second parameters are identified to increase a likelihood of determining a second reward that is better than the first reward.

6. The method of claim 1, further comprising:

iteratively identifying, with the one or more processors, additional parameters for a PPA for additional hardware corresponding to the machine learning model via the offline-trained machine learning model, the additional parameters being identified based on a determined reward from a previous iteration;

iteratively determining, with the one or more processors, additional rewards based on the additional identified parameters; and stopping, with the one or more processors, the iterative identifying and determining based on a stopping criterion;

wherein selecting hardware corresponding to the machine learning model further comprises selecting hardware with parameters for PPA that corresponds to a reward that resulted in the stopping criterion.

7. The method of claim 6, wherein the stopping criterion comprises the iteratively determined rewards approaching a convergence.

8. A system comprising:

one or more processors; and one or more storage devices coupled to the one or more processors and storing instructions that, when executed by the one or more processors, causes the one or more processors to perform operations for performing a joint neural architecture and hardware architecture search, the operations comprising:

performing a multi-trial search governing multiple OneShot searches for different machine learning models to perform a particular task;

determining a machine learning model to which a first hardware and a second hardware correspond based on the multi-trial search;

identifying first parameters for a performance, power, and area (PPA) for the first hardware via an offline-trained machine learning model for predicting PPA;

determining a first reward based on the first identified parameters;

identifying second parameters for a PPA for the second hardware via the offline-trained machine learning model, the second parameters being identified based on the first reward;

determining a second reward based on the second identified parameters; and selecting hardware corresponding to the machine learning model based on the first reward and the second reward to perform the particular task.

9. The system of claim 8, wherein the operations further comprise identifying one or more parameters for a quality of the machine learning model via a neural architecture search, wherein determining the first reward is based further on the one or more parameters for the quality of the machine learning model.

10. The system of claim 8, wherein the operations further comprise:

generating simulation results for performance, power, and area based on a dataset of sample model architectures, hardware architectures, and mapping strategies; and training the offline-trained machine learning model based on the simulation results.

11. The system of claim 8, wherein the first reward is determined by a rectified linear unit single-sided weighted sum reward function with the first parameters for performance, power, and area each included as separate sums in the reward function.

12. The system of claim 8, wherein the second parameters are identified to increase a likelihood of determining a second reward that is better than the first reward.

13. The system of claim 8, wherein the operations further comprise:

iteratively identifying additional parameters for a PPA for additional hardware corresponding to the machine learning model via the offline-trained machine learning model, the additional parameters being identified based on a determined reward from a previous iteration;

iteratively determining additional rewards based on the additional identified parameters; and stopping the iterative identifying and determining based on a stopping criterion;

wherein selecting hardware corresponding to the machine learning model further comprises selecting hardware with parameters for PPA that corresponds to a reward that resulted in the stopping criterion.

14. The system of claim 13, wherein the stopping criterion comprises the iteratively determined rewards approaching a convergence.

15. A non-transitory computer readable medium for storing instructions that, when executed by one or more processors, causes the one or more processors to perform operations for performing a joint neural architecture and hardware architecture search, the operations comprising:

performing a multi-trial search governing multiple One-Shot searches for different machine learning models to perform a particular task;

determining a machine learning model to which a first hardware and a second hardware correspond based on the multi-trial search;

identifying first parameters for a performance, power, and area (PPA) for the first hardware via an offline-trained machine learning model for predicting PPA;

determining a first reward based on the first identified parameters;

identifying second parameters for a PPA for the second hardware via the offline-trained machine learning model, the second parameters being identified based on the first reward;

determining a second reward based on the second identified parameters; and selecting hardware corresponding to the machine learning model based on the first reward and the second reward to perform the particular task.

16. The non-transitory computer readable medium of claim 15, wherein the operations further comprise:

generating simulation results for performance, power, and area based on a dataset of sample model architectures, hardware architectures, and mapping strategies; and training the offline-trained machine learning model based on the simulation results.

17. The non-transitory computer readable medium of claim 15, wherein the first reward is determined by a rectified linear unit single-sided weighted sum reward function with the first parameters for performance, power, and area each included as separate sums in the reward function.

* * * * *